No. 618,755. Patented Jan. 31, 1899.
A. J. WHISLER.
PNEUMATIC TIRE.
(Application filed Aug. 1, 1898.)
(No Model.) 2 Sheets—Sheet 1.
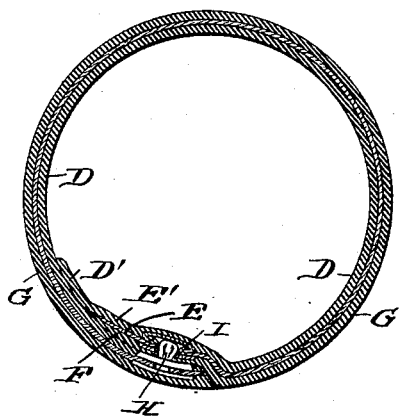
Fig. 2.
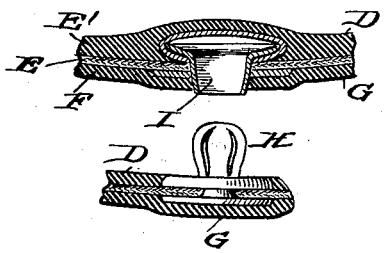
Fig. 3.
Fig. 1.
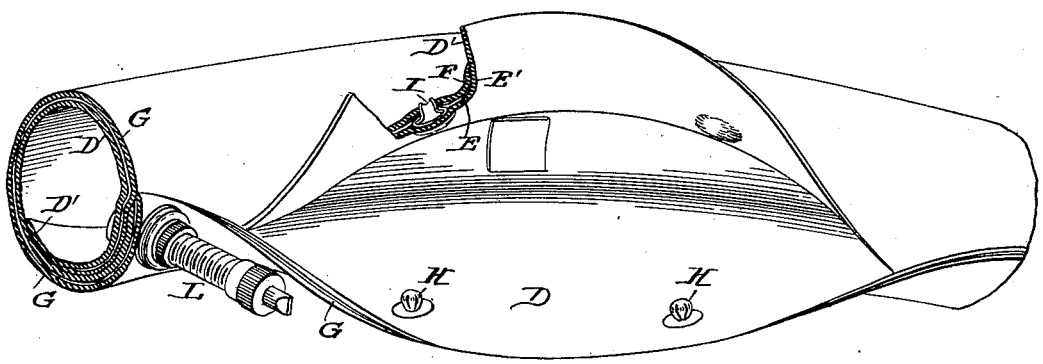
Fig. 4.
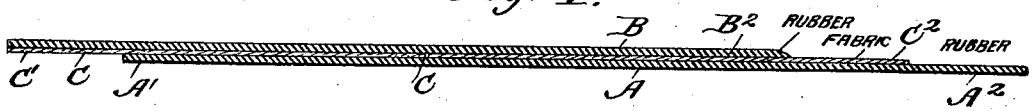
Fig. 5.
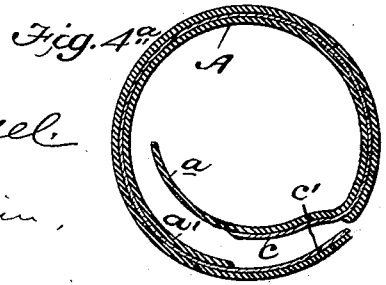
Fig. 4ª.
WITNESSES:
M. Blondel
P. B. Turpin
INVENTOR
Arrah J. Whisler.
BY Munn & Co.
ATTORNEYS.

No. 618,755. Patented Jan. 31, 1899.
A. J. WHISLER.
PNEUMATIC TIRE.
(Application filed Aug. 1, 1898.)
(No Model.) 2 Sheets—Sheet 2.
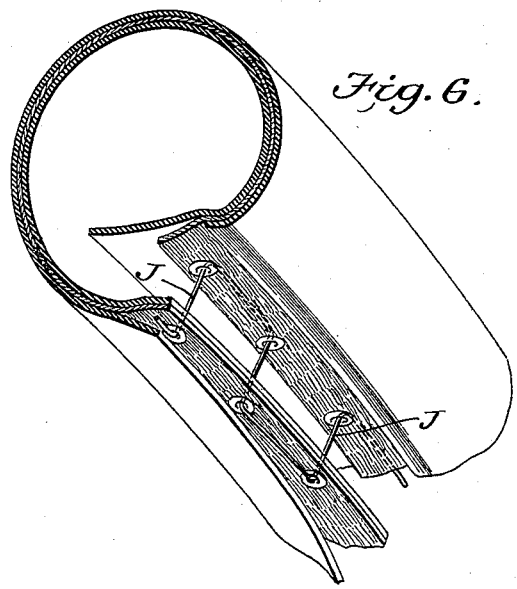
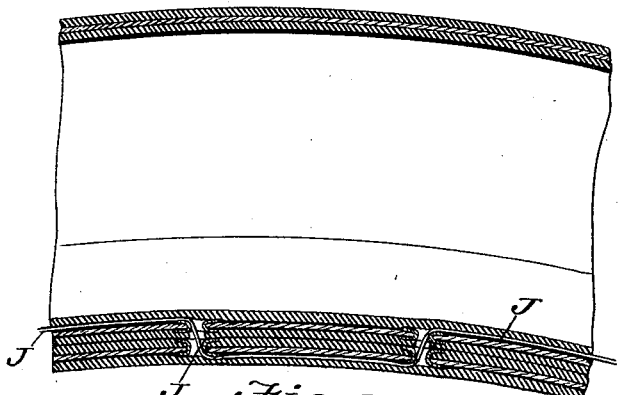
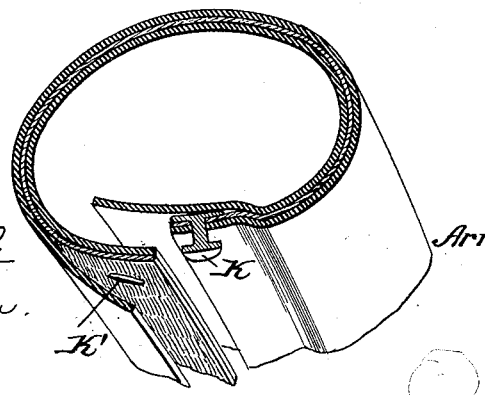
WITNESSES:
M. S. Bloudel.
P. B. Turpin.
INVENTOR
Arrah J. Whisler.
BY Munn & Co.
ATTORNEYS.

UNITED STATES PATENT OFFICE.

ARRAH J. WHISLER, OF KOKOMO, INDIANA.

PNEUMATIC TIRE.

SPECIFICATION forming part of Letters Patent No. 618,755, dated January 31, 1899.

Application filed August 1, 1898. Serial No. 687,441. (No model.)

*To all whom it may concern:*

Be it known that I, ARRAH JASPER WHISLER, of Kokomo, in the county of Howard and State of Indiana, have invented a new and useful Improvement in Pneumatic Tires, of which the following is a specification.

My invention is an improvement in pneumatic tires, seeking to provide a tire which can be easily opened at any point to permit the repair of a puncture from the interior of the tire, where it can be effectually repaired by a patch or otherwise without injury to the tire and without disfiguring the exterior of the tire in any way, the tire being then closed and sealed as before; and the invention consists in certain novel constructions and combinations of parts, as will be hereinafter described, and pointed out in the claim.

In the drawings, Figure 1 is a perspective view of my tire opened at one point to permit the repair of a puncture. Fig. 2 is a cross-sectional view thereof. Fig. 3 is a detail sectional view illustrating the fastenings. Figs. 4 and 5 illustrate the tire in cross-section opened out, Fig. 4 showing one and Fig. 5 two layers of fabric. Fig. 4$^a$ illustrates the construction shown in Fig. 4 bent into approximately tubular form. Fig. 6 is a perspective view, and Fig. 7 a longitudinal section, of a portion of a tire, showing a lacing for fastening the edges of the tire; and Fig. 8 is a sectional perspective view illustrating a construction wherein the tire edges are buttoned together.

The purpose of my invention is to provide a simple practicable tire which can be easily opened at any point a sufficient distance to permit the repair from within of punctures, tears, or other injuries and the ready closing of such tire, so it can be again inflated for use. There are many advantages incident to so repairing the tire from within, among which may be mentioned the fact that thereby unsightly patches on the outside of the tire are avoided, and the patch on the interior of the tire will be more secure and effective, as the air-pressure will tend to hold it in place.

My tire as shown in Figs. 4 and 4$^a$ is composed of the inner layer A of rubber, the outer layer B of rubber, and the intermediate layer C of fabric. At one edge C' the fabric C is even with the edge B' of the rubber layer B, while the other edge of the fabric C extends at C$^2$ beyond the edge B$^2$ of the outer rubber layer B. The inner layer A is set at one edge A' back from the edge C' of the fabric and extends at its edge A$^2$ beyond the edge C$^2$ of the fabric a distance about equal to that which its edge A' is set back from the edge C'. This construction provides, when the tire is bent to form, as indicated in Fig. 4$^a$, the inner rubber flap or extension $a$, which overlaps the other edge of the layer A at $a'$. The fabric extension $c$, which overlaps the other edge of the section C at $c'$, and the overlapping portions of the inner rubber and of the fabric are cemented together. The said construction is similar to that shown in Figs. 1 and 2 in that it provides an extension of the inner rubber lining beyond one edge of the body of the tire which laps within and is secured to the other edge of the tire, as shown in Fig. 2.

In the construction shown in Figs. 1 and 2 the extension D' of the inner rubber layer B is reinforced for a portion of its width at E' by the fabric layer E, whose outer side is covered by a thin rubber layer F, extending from the outer rubber layer G. The tire thus made has a smooth inner lining of rubber, so it will adhere perfectly when cemented, securing an air-tight joint. In making the tire the rubber and fabric layers may be cemented or otherwise secured together to form the tire. Where desired, more than one layer of fabric may be used, as will be understood from Fig. 5, in which I show two layers of fabric.

The edge extension of the inner lining is brought to overlap the opposite edge of the tire and is firmly cemented thereto, forming an air-tight joint extending entirely around the tire. In case of a puncture the tire can be deflated and taken from the rim and the outer flap or lapped portion stripped from the inner, as shown in Fig. 1, or the tire may be opened all around. Then when the tire is repaired the lapping parts may be brought together and secured air-tight, as before described.

For greater security and to relieve the cement from strain I prefer to employ fastening devices connecting the edges of the tire mechanically. As shown in Figs. 1, 2, and 3, and as preferred, this mechanical fastening consists of the clasp composed of the head H and socket I, secured to the opposite overlapping portions and interlocked, as will be readily understood. These clasps, arranged at intervals, operate to unite the edges of the tire by mechanical means, and so relieve the cement of strain and enable it to efficiently perform its function of securing the air-tight union of the edges of the tire.

As will be understood from Fig. 3, it is preferred to vulcanize the inner rubber layer or lining over the base of the socket-section.

While the head and socket clasp may be preferred, it will be understood that I may employ other forms of fastening devices—such, for instance, as the lacings J shown in Figs. 6 and 7 or the button K and buttonhole K' shown in Fig. 8.

An important feature of my improvement is that it involves no change in the rim, but the tire is applicable to the usual form of rim commonly employed.

The valve L may be a shoe-valve, rubber stem, or other desired form of valve, and can be readily removed and replaced or shifted from place to place in case of breakage at its initial position, as the improved construction permits the convenient repair of opening left by removing the valve and the easy application of said valve at any point desired.

It should be understood that in making the inner lining or sheet D, I do not apply the same in the form of an uncured or unvulcanized sheet, but treat the same by semivulcanizing it on a smooth surface, so its inner or exposed face will be smooth and partially vulcanized, so it will properly receive the cement and permit a secure cementing of the overlapping extension.

It should be understood that I do not desire to be limited in the broad features of my invention to the use of mechanical fastenings; but I prefer to use such fastenings, as they facilitate the proper cementing of the tire by holding the cemented parts firmly together until the cement sets, and also relieve the cement of the major part of the strain.

While it may be preferred to arrange the joint on the inner side of the tire, it may be arranged at either side or the outer side thereof, if preferred.

Having thus described my invention, what I claim as new, and desire to secure by Letters Patent, is—

An improved tire comprising an inner layer of rubber, an outer layer of rubber and a layer of fabric intermediate the said inner and outer layers, said fabric being extended at one edge beyond the outer layer and at its other edge beyond the inner layer of rubber whereby when the tire is formed the extended edge of fabric will overlap and may be secured together, substantially as set forth.

ARRAH J. WHISLER.

Witnesses:
SOLON C. KEMON,
PERRY B. TURPIN.